(12) United States Patent
Togano et al.

(10) Patent No.: US 8,775,703 B2
(45) Date of Patent: Jul. 8, 2014

(54) CONVERSION DEVICE, PERIPHERAL DEVICE, AND PROGRAMMABLE LOGIC CONTROLLER

(75) Inventors: Kentaro Togano, Chiyoda-ku (JP); Satoru Ukena, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/810,027

(22) PCT Filed: Mar. 28, 2012

(86) PCT No.: PCT/JP2012/058190
§ 371 (c)(1),
(2), (4) Date: Jan. 14, 2013

(87) PCT Pub. No.: WO2013/145170
PCT Pub. Date: Oct. 3, 2013

(65) Prior Publication Data
US 2013/0262722 A1    Oct. 3, 2013

(51) Int. Cl.
*G06F 3/05*    (2006.01)
*G06F 13/00*    (2006.01)

(52) U.S. Cl.
USPC ............ 710/69; 710/2; 710/5; 710/8; 710/11; 710/15

(58) Field of Classification Search
None
See application file for complete search history.

(56) References Cited

U.S. PATENT DOCUMENTS

2002/0007426 A1* 1/2002 Ando et al. ..................... 710/25
2008/0291987 A1* 11/2008 Kumaki et al. ............... 375/224

FOREIGN PATENT DOCUMENTS

| JP | 3-53017 U | 5/1991 |
| JP | 05-063448 A | 3/1993 |
| JP | 07-078007 A | 3/1995 |
| JP | 2914100 B2 | 6/1999 |

* cited by examiner

*Primary Examiner* — Scott Sun
(74) *Attorney, Agent, or Firm* — Sughrue Mion, PLLC; Richard C. Turner

(57) ABSTRACT

A D/A conversion device includes a waveform-data-string storage area that stores therein a waveform data string including a plurality of digital values, a waveform-output-control-data storage area in which operation-mode specifying data and update request data are written, a digital-value output unit that, when the operation-mode specifying data specifies an automatic control mode, while sequentially updating an address to be read in the waveform-data-string storage area for each output period set in advance, sequentially reads and outputs a digital value and that, when the operation-mode specifying data specifies a step execution mode or an output-address change mode, while updating the address to be read at a timing when the update request data is written, reads and outputs the digital value, and a D/A conversion unit that converts the digital value output from the digital-value output unit into an analog value.

9 Claims, 3 Drawing Sheets

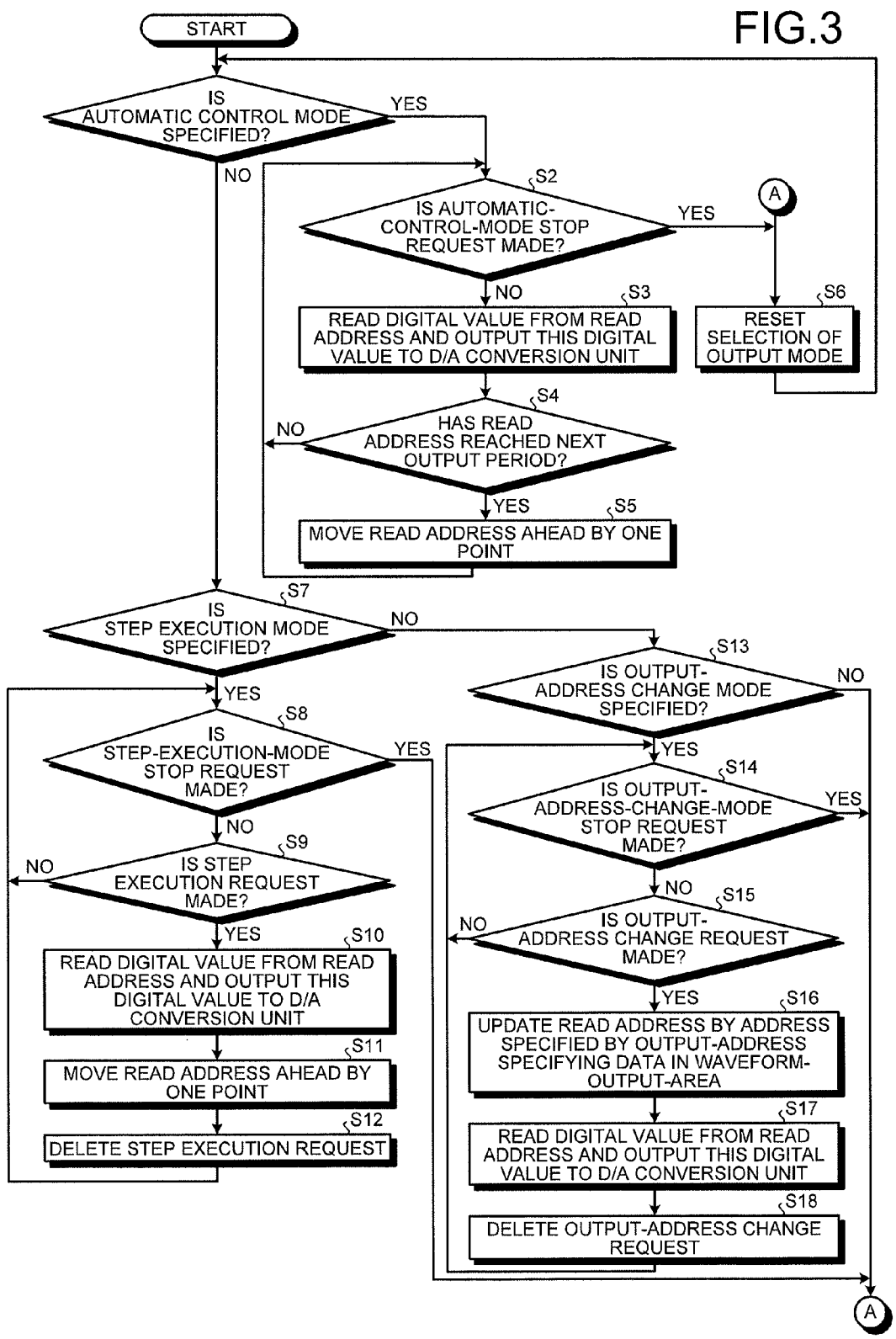

CONVERSION DEVICE, PERIPHERAL DEVICE, AND PROGRAMMABLE LOGIC CONTROLLER

CROSS REFERENCE TO RELATED APPLICATIONS

This application is a National Stage of International Application No. PCT/JP2012/058190 filed Mar. 28, 2012, the contents of all of which are incorporated herein by reference in their entirety.

FIELD

The present invention relates to a conversion device that performs digital-to-analog conversion (D/A conversion), a peripheral device that performs setting of the conversion device, and a programmable logic controller.

BACKGROUND

A programmable logic controller (PLC) is constituted by having incorporated therein a conversion device (hereinafter, "D/A conversion device") that converts a digital value generated within the PLC into an analog value to input the analog value to a controlled device. As a conventional D/A conversion device, there is one type of D/A conversion device that consecutively D/A converts a digital value when the digital value is written from outside of the D/A conversion device (for example, a CPU device constituting the PLC) for each predetermined period. Even when the conventional D/A conversion device has a capability of quickly performing D/A conversion, because an actual D/A conversion rate depends on a rate at which a digital value is written from outside, there is problem in that the actual D/A conversion rate is decreased.

In this connection, for example, Patent Literature 1 discloses an analog-signal processing device for a programmable logic controller that performs a series of operations from A/D conversion to D/A conversion based on an analog signal input from outside without using any CPU device.

CITATION LIST

Patent Literature

Patent Literature 1: Japanese Patent No. 2914100 (see, for example, paragraph [0033] and FIG. 4)

SUMMARY

Technical Problem

However, according to the technique of Patent Literature 1, because a digital value is calculated every time when the analog-signal processing device for a PLC performs D/A conversion, the D/A conversion rate cannot be sufficiently high.

The present invention has been achieved in view of the above problems, and an object of the present invention is to provide a conversion device that can output a waveform as quickly as possible and debug an output waveform, a peripheral device, and a programmable logic controller.

Solution to Problem

There is provided a conversion device according to an aspect of the present invention including: a waveform-data-string storage unit that stores therein a waveform data string including a plurality of digital values; a control-data storage unit in which operation-mode specifying data that specifies an operation mode and update request data are written; a digital-value output unit that, when the operation-mode specifying data specifies a first operation mode, while sequentially updating an address to be read in the waveform-data-string storage unit to an address where a subsequent digital value is stored for each output period set in advance, sequentially reads and outputs the digital value that constitutes the waveform data string from the address to be read for each output period and that, when the operation-mode specifying data specifies a second operation mode, while updating the address to be read at a timing when the update request data is written, reads and outputs the digital value that constitutes the waveform data string from the address to be read; and a D/A conversion unit that converts the digital value output by the digital-value output unit into an analog value.

Advantageous Effects of Invention

According to the conversion device of the present invention, when a first operation mode is specified, a digital value internally prepared in advance as a waveform data string is consecutively converted into an analog value, and when a second operation mode is specified, a read source address is updated at a timing when update request data is written. Accordingly, a waveform can be output as quickly as possible and an output waveform can be debugged.

BRIEF DESCRIPTION OF DRAWINGS

FIG. 3 is a flowchart of an operation of a digital-value output unit of a D/A conversion device according to the embodiment of the present invention.

DESCRIPTION OF EMBODIMENTS

Exemplary embodiments of a conversion device, a peripheral device, and a programmable logic controller according to the present invention will be explained below in detail with reference to the accompanying drawings. The present invention is not limited to the embodiments.

Embodiment

Figure 1:
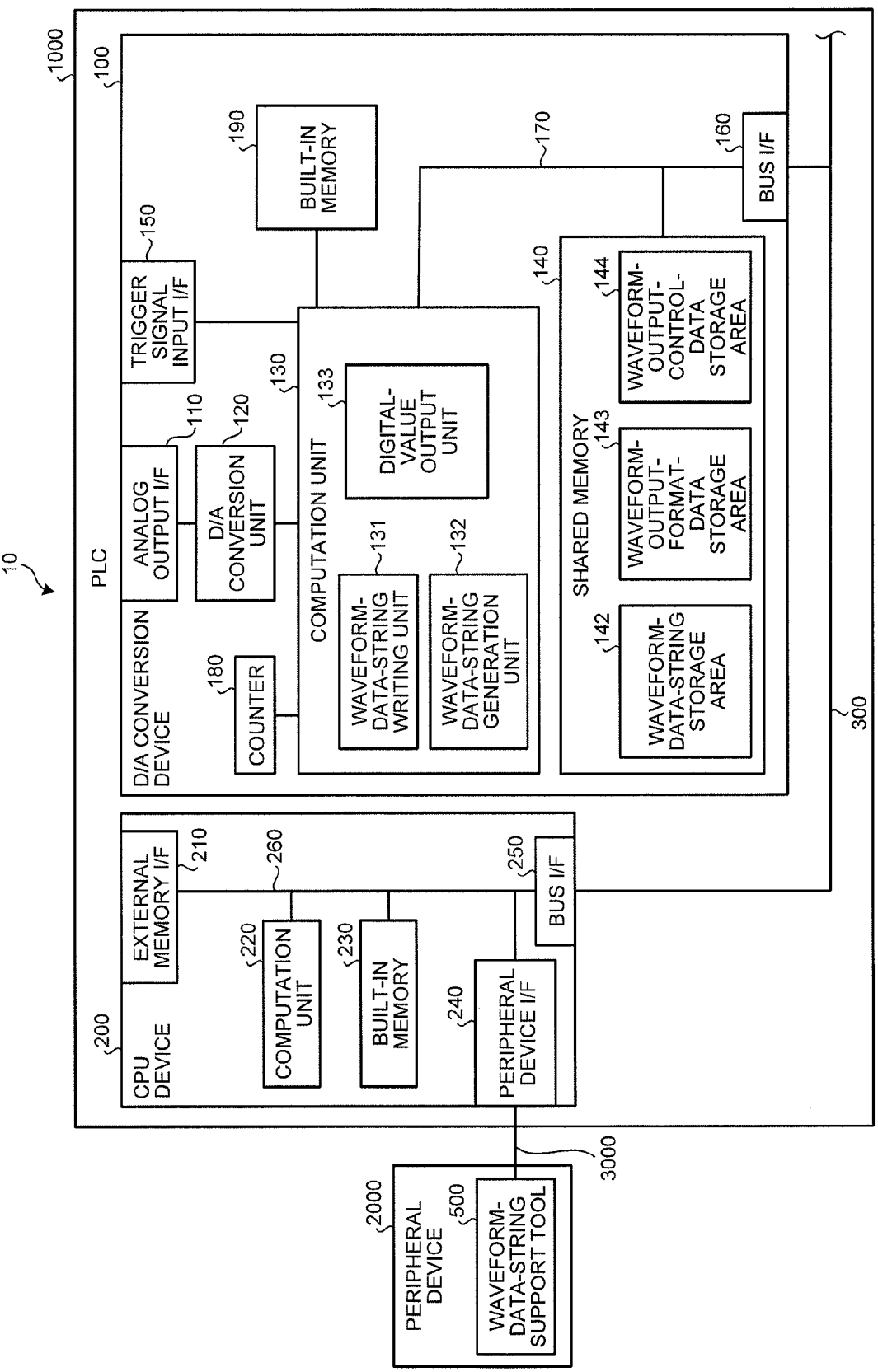
FIG. 1 depicts a configuration of a PLC system including a D/A conversion device according to an embodiment of the present invention.

FIG. 1 is a block diagram of a configuration of a PLC system 10 including a D/A conversion device according to an embodiment. The PLC system 10 shown in FIG. 1 includes a PLC 1000 and a peripheral device 2000. The PLC 1000 and the peripheral device 2000 are connected to each other via a connection cable 3000.

The peripheral device 2000 includes a waveform-data-string support tool 500 that can perform setting or debugging of a D/A conversion device 100 according to the embodiment of the present invention. The waveform-data-string support tool 500 is realized by installing software for operating waveform data strings in the peripheral device 2000. Specifically, the peripheral device 2000 includes a CPU (Central Processing Unit), a ROM (Read Only Memory) that stores therein software for operating waveform data strings in advance, a RAM (Random Access Memory), an input device (input unit) constituted by a mouse or a keyboard receiving inputs from a user, and a display device constituted by a liquid crystal display. The CPU loads this software for operating waveform data strings in the RAM and functions as the waveform-data-string support tool 500 based on control by the software for operating waveform data strings loaded in the RAM. A display content generated by the waveform-data-string support tool 500 is displayed on the display device. By operating the input device while confirming this display content, a user can perform a setting operation or a debugging operation on the waveform-data-string support tool 500.

The PLC 1000 includes the D/A conversion device 100 and a CPU device 200. The PLC 1000 can further include other devices (not shown). Examples of other devices (not shown) include a motion controller device that controls a servo amplifier to realize multi-axis position control and a temperature controller device that outputs a temperature control signal based on a command from the CPU device 200.

The respective devices included in the PLC 1000 are connected to each other via an inter-device bus 300.

The CPU device 200 includes a computation unit 220 that controls the entire CPU device 200, an external memory interface 210 connected to an external memory such as a memory card, and a built-in memory 230. A user program, data used for executing the user program, and data of a result of executing the user program are stored in the external memory or the built-in memory 230. In this example, the user program is a program for controlling an external device to be controlled by the PLC 1000, and is constituted by a ladder program or a C language program, for example. The CPU device 200 also includes a peripheral device interface 240 connected to the peripheral device 2000 and a bus interface 250 connected to the inter-device bus 300. The external memory interface 210, the computation unit 220, the built-in memory 230, the peripheral device interface 240, and the bus interface 250 are connected to each other via an internal bus 260.

The CPU device 200 repeatedly executes the user program, reads the data used for executing the user program, and writes the result of executing the user program for each predetermined control period. This control period is equal to a period during which the CPU device 200 executes the user program. A write operation of the result of executing the user program includes an operation of writing a digital value into a shared memory 140 of the D/A conversion device 100 to be explained later.

The D/A conversion device 100 includes a computation unit 130 that controls the entire D/A conversion device 100, the shared memory 140 to which the CPU device 200 can perform read and write operations, and a D/A conversion unit 120 that converts a digital value into an analog value. The D/A conversion device 100 also includes an analog output interface 110 connected to an external device (that is, a controlled device) to be controlled by the PLC 1000, a trigger-signal input interface 150 connected to an external input terminal to which a trigger signal is input, a bus interface 160 connected to the inter-device bus 300, and a counter 180 that outputs a counter signal for each D/A conversion period. The D/A conversion period is a value set as a period during which one digital value is converted into an analog value.

The computation unit 130, the shared memory 140, and the bus interface 160 are connected to each other via an internal bus 170. The D/A conversion unit 120 is connected to the computation unit 130 and the analog output interface 110 is connected to the D/A conversion unit 120. The trigger-signal input interface 150 is connected to the computation unit 130.

Figure 2:
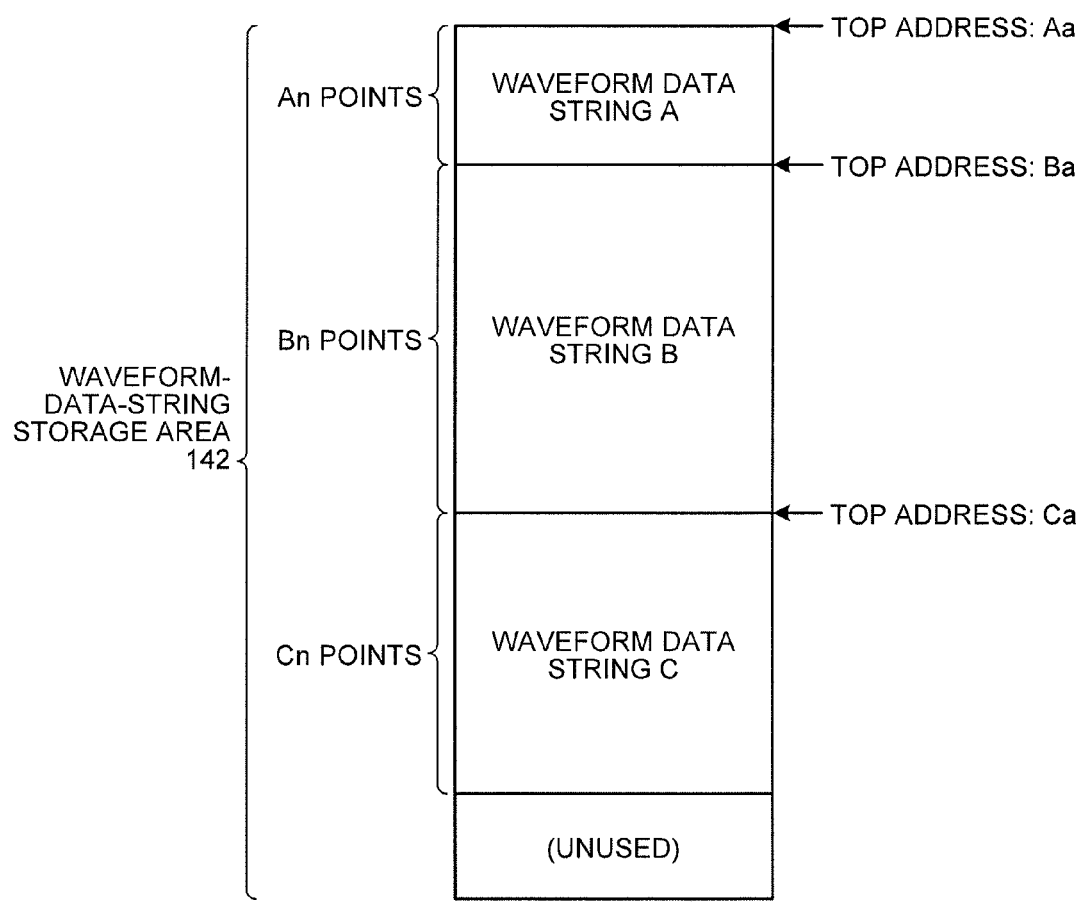
FIG. 2 depicts a data structure of a waveform-data-string storage area.

The shared memory 140 includes a waveform-data-string storage area 142 for storing therein a waveform data string. The waveform data string is a digital data string constituted by a plurality of digital values. FIG. 2 depicts a data structure of the waveform-data-string storage area 142. The waveform-data-string storage area 142 is secured so as to store therein a plurality of waveform data strings. Each waveform data string can be constituted by an arbitrary number of points. This number of points means the number of pieces of data. For example, one point is equivalent to 16 or 32 bits and corresponds to one digital value.

The shared memory 140 also includes a waveform-output-format-data storage area 143 for storing therein waveform-output format data. The waveform-output format data is a parameter specifying an output format of a waveform output from the analog output interface 110 by the D/A conversion device 100. In the present embodiment, the waveform-output format data specifies a top address, the number of pieces of output data, and an output period. The top address is an address of a first digital value of a waveform data string stored in the waveform-data-string storage area 142. In an example of FIG. 2, the top address of "waveform data string A" stored in the waveform-data-string storage area 142 is "Aa". The number of pieces of output data is the number of points of the waveform data string. That is, the number of pieces corresponds to the number of digital values constituting the waveform data string. In the example of FIG. 2, the number of pieces of output data of "waveform data string A" is "An points". The output period is specified by a value provided by multiplying the D/A conversion period by an integer equal to or larger than 1.

According to the present embodiment, while sequentially updating an address to be read in the waveform-data-string storage area 142 to an address where a subsequent digital value is stored for each output period set in advance, the D/A conversion device 100 can sequentially read output data from the address to be read for each output period and can consecutively D/A-convert and output each piece of read output data. With this configuration, D/A conversion can be performed without requiring any input of a digital value from the CPU device 200 for each D/A conversion. Because the D/A conversion device 100 consecutively converts a digital value internally prepared in advance as the waveform data string into an analog value, the analog value can be output at a rate up to a D/A conversion rate by the D/A conversion unit 120. Furthermore, as compared to a system of consecutively calculating a digital value and converting the calculated digital value into an analog value, this configuration can output (calculate) the analog value more quickly. An operation mode of, while automatically incrementing a read source address of output data, sequentially converting read output data into an analog value to output an analog value is represented as an automatic control mode (first operation mode).

Further, according to the present embodiment, the D/A conversion device 100 can operate at an operation mode (second operation mode) in which an address is not automatically incremented but updated by an address update command as a trigger so that a waveform output at the automatic control mode can be debugged. A step execution mode and an output-address change mode are prepared as the operation mode for debugging. The step execution mode is an operation mode in which an address is incremented each time an address update command is issued, that is, a read source address is updated to an address where a subsequent digital value constituting a waveform data string is stored. In addition, issuing the address update command during an operation of the D/A conversion device 100 at the step execution mode is represented as step execution. The output-address change mode is an operation mode in which a read source address of output data is caused to jump from the last address where the output data is read at the time point to an address specified by output-address specifying data. A jump destination address is specified by waveform-output control data to be explained later. Because the D/A conversion device 100 supports the step execution mode, a user can confirm whether the waveform output at the automatic control mode has a desired shape or not for each piece of data of an output analog value. Furthermore, because the D/A conversion device 100 supports the output-address change mode, a user can confirm a value of an arbitrary position in the waveform of analog values that are continuously output. A user can also confirm an arbitrary waveform data string among a plurality of waveform data strings.

As a configuration for the D/A conversion device 100 to operate in an operation mode for debugging, the shared memory 140 includes a waveform-output-control-data storage area 144 for storing therein the waveform-output control data. The waveform-output control data is a command and a parameter for switching the operation mode of the D/A conversion device 100 and for operations at the respective operation modes. For example, the waveform-output control data includes operation-mode specifying data for specifying an operation mode. By the operation-mode specifying data, one of the automatic control mode, the step execution mode, and the output-address change mode is specified. The waveform-output control data also includes step-execution request data used as an address update trigger, the output-address specifying data that specifies a jump destination address by the output-address change mode, output-address change-request data used as a trigger for causing a read source address of output data to jump to an address specified by the output-address specifying data, a parameter indicating the current operation mode, and an address (hereinafter, "read address") where the output data is read at the next output period. The waveform-output control data can include various parameters such as a currently outputting address serving as a storage source address of the last output data at the time point.

For example, the computation unit 130 shown in FIG. 1 is realized when a microperipheral device or a dedicated LSI (an ASIC) executes a system program stored in a built-in memory 190. The storage source of the system program is not limited to the built-in memory 190 as long as the computation unit 130 can read the program. The storage source of the system program can be an external memory, for example. The computation unit 130 includes a waveform-data-string writing unit 131 that writes a waveform data string in the waveform-data-string storage area 142, a waveform-data-string generation unit 132 that generates a waveform data string based on waveform identifying data to be explained later, and a digital-value output unit 133 that reads a digital value from the waveform-data-string storage area 142 and outputs this digital value to the D/A conversion unit 120.

The waveform data string is written in the waveform-data-string storage area 142 by one of the following five methods. A first method is that the computation unit 220 of the CPU device 200 executes a user program stored in the built-in memory 230 or an external memory to create a waveform data string and write this waveform data string in the waveform-data-string storage area 142. This process is realized by providing the waveform-data-string storage area 142 in the shared memory 140 that is directly writable from the CPU device 200.

In a second method, a user first attaches an external memory in which a waveform data string is stored in advance to the external memory interface 210 of the CPU device 200. Next, the CPU device 200 requests the D/A conversion device 100 to perform reading from the external memory. Subsequently, when the waveform-data-string writing unit 131 of the D/A conversion device 100 receives this request, the D/A conversion device 100 reads the waveform data string stored in the external memory via the inter-device bus 300 and writes this waveform data string in the waveform-data-string storage area 142.

In a third method, a user first operates a mouse to draw a waveform on the waveform-data-string support tool 500 of the external peripheral device 2000, thereby creating waveform graphical data. Next, the waveform-data-string support tool 500 creates a waveform data string based on the graphical waveform data created by the operation of the user and writes this waveform data string in the waveform-data-string storage area 142 via the CPU device 200 and the inter-device bus 300.

In a fourth method, a user first stores a CSV format file or an Excel format file in which a waveform data string is stored in the external peripheral device 2000. Next, the waveform-data-string support tool 500 of the peripheral device 2000 reads the waveform data string from this file and writes this waveform data string into the waveform-data-string storage area 142 via the CPU device 200 and the inter-device bus 300.

In a fifth method, a user first operates an external device such as the peripheral device 2000 to transmit data (hereinafter, "waveform identifying data") that identifies a basic waveform such as a sine wave, a rectangular wave, a triangular wave, or a PWM wave to the waveform-data-string generation unit 132 of the D/A conversion device 100. For example, as the waveform identifying data, a type of waveform such as "sine wave", a period of the waveform, and an amplitude of the waveform are included. Next, the waveform-data-string generation unit 132 generates a waveform data string based on this waveform identifying data. The waveform-data-string writing unit 131 then writes the waveform data string generated by the waveform-data-string generation unit 132 into the waveform-data-string storage area 142. With this process, for example, at the time of starting up the PLC system 10, an output of the D/A conversion device 100 can be easily confirmed and wires can be easily checked without using any user program for the CPU device.

The waveform data string is written in the waveform-data-string storage area 142 at an arbitrary timing by any of the above five methods. At this time, the top address of a waveform data string newly written in the waveform-data-string storage area 142 is behind the last address of the waveform data string previously written in the waveform-data-string storage area 142 by one point. That is, in the example of FIG. 2, a top address "Ba" of "waveform data string B" written in the waveform-data-string storage area 142 immediately after "waveform data string A" is behind the last address of "waveform data string A" by one point. Alternatively, it is also possible to configure such that when "waveform data string B" is written, "waveform data string A" is overwritten by the "waveform data string B". Furthermore, it is also possible to configure such that a value stored at an address specified by a user among digital values constituting the waveform data string is individually rewritten.

The waveform-output format data is written in the waveform-output-format-data storage area 143 when or after the waveform data string is written in the waveform-data-string storage area 142. At this time, the waveform-output format data is written into the waveform-output-format-data storage area 143 by a method of writing the waveform data string in the waveform-data-string storage area 142. That is, when the waveform data string is written in the waveform-data-string storage area 142 by the first method mentioned above, the computation unit 220 of the CPU device 200 writes the waveform-output format data into the waveform-output-format-data storage area 143.

The waveform-output control data is written in the waveform-output-control-data storage area 144 by any of the following three methods. A first method is that the CPU device 200 executes a user program to write waveform-output control data into the waveform-output-control-data storage area 144. This is realized by providing the waveform-output-control-data storage area 144 in the shared memory 140 that is directly writable from the CPU device 200.

In a second method, a user first registers waveform-output control data on the waveform-data-string support tool 500 of the peripheral device 2000. A user then issues a write command on the waveform-data-string support tool 500 to write the waveform-output control data into the waveform-output-control-data storage area 144 via the CPU device 200 and the inter-device bus 300.

In a third method, the digital-value output unit 133 writes waveform-output control data into the waveform-output-control-data storage area 144. In this method, the digital-value output unit 133 detects a computation result of the digital-value output unit 133 and an input to the trigger signal input interface 150 to write the waveform-output control data.

That is, the D/A conversion device 100 can receive a step execution request serving as an address update trigger and an output-address change request serving as a trigger for changing a read address by one of the following four methods.

- A method of receiving a request issued from the CPU device 200
- A method of receiving a request issued from the waveform-data-string support tool 500
- A method in which the digital-value output unit 133 itself issues a request in reaction to a computation result of the digital-value output unit 133 and receives this request
- A method of receiving a request input from the trigger signal input I/F 150

Output-address specifying data can be described in any format as long as it is in a format capable of specifying a jump destination address. For example, a method of relatively specifying a movement amount from the current output address or a method of specifying an absolute jump destination address is provided.

Next, an operation of the digital-value output unit 133 according to the present embodiment is explained with reference to FIG. 3. FIG. 3 is a flowchart of an operation of the digital-value output unit 133 of the D/A conversion device 100 according to the present embodiment. The digital-value output unit 133 refers to the operation-mode specifying data included as a parameter constituting waveform-output control data to determine whether an automatic control mode is specified (Step S1). When the automatic control mode is selected (YES at Step S1), the digital-value output unit 133 determines whether an automatic-control-mode stop request is made (Step S2). When the automatic-control-mode stop request is not made (NO at Step S2), the digital-value output unit 133 reads a digital value stored at a read address in the waveform-data-string storage area 142 and outputs this digital value to the D/A conversion unit 120 (Step S3). The read address at the time of outputting a first digital value of the waveform data string to the D/A conversion unit 120 is the top address described above.

The digital value output to the D/A conversion unit 120 in the process of Step S3 is converted into an analog value by the D/A conversion unit 120. This analog value is then output via the analog output interface 110 to an external device as a current value or a voltage value.

After the process of Step S3, the digital-value output unit 133 determines whether it has reached the next output period (Step S4). The digital-value output unit 133 performs the determining process of Step S4 based on a counter signal from the counter 180 and the output period recorded in the waveform-output-format-data storage area 143.

When it has reached the next output period (YES at Step S4), the digital-value output unit 133 changes the read address so as to approach the last address by one point (Step S5) and performs the determining process of Step S2. When it has not reached the next output period (NO at Step S4), the digital-value output unit 133 skips the process of Step S5.

When the automatic-control-mode stop request is made (YES at Step S2), the digital-value output unit 133 deletes the operation-mode specifying data (Step S6) and then performs the determining process of Step S1. The automatic-control-mode stop request and an output-address-change-mode stop request to be explained later can be given by a command that constitutes the waveform-output control data similarly to the step execution request and the output-address change request.

When the automatic control mode is not specified (NO at Step S1), the digital-value output unit 133 determines whether the step execution mode is specified by the operation-mode specifying data (Step S7). When the step execution mode is specified (YES at Step S7), the digital-value output unit 133 determines whether a step-execution-mode stop request is made (Step S8). When the step-execution-mode stop request is not made (NO at Step S8), the digital-value output unit 133 determines whether the step execution request is issued (Step S9).

Whether the step execution request is issued can be confirmed by referring to a step-execution-request data value included as a parameter constituting the waveform-output control data. For example, a state where the step-execution-request data value is "1" indicates a state where the step execution request is issued. A state where the step-execution-request data value is "0" indicates a state where the step execution request is not issued.

When the step execution request is not issued (NO at Step S9), the digital-value output unit 133 performs the process of Step S8. When the step execution request is issued (YES at Step S9), the digital-value output unit 133 reads a digital value stored at the read address in the waveform-data-string storage area 142 and outputs this digital value to the D/A conversion unit 120 (Step S10). The digital-value output unit 133 then moves the read address ahead by one point (Step S11). The digital-value output unit 133 deletes the step execution request (Step S12) and then performs the determining process of Step S8. Deleting the step execution request means rewriting the step-execution-request data value to a value that indicates the state where the step execution request is not issued.

When the step execution mode is not specified (NO at Step S7), the digital-value output unit 133 determines whether the output-address change mode is specified by the operation-mode specifying data (Step S13). When the output-address change mode is specified (YES at Step S13), the digital-value output unit 133 determines whether the output-address-change-mode stop request is made (Step S14). When the output-address-change-mode stop request is not made (NO at Step S14), the digital-value output unit 133 determines whether the output-address change request is issued (Step S15). Whether the output-address change request is issued or not can be confirmed by referring to an output-address-change-request data value included as a parameter constituting the waveform-output control data. For example, a state where the output-address-change-request data value is "1"

indicates a state where the output-address change request is issued. A state where the output-address-change-request data value is "0" indicates a state where the output-address change request is not issued.

When the output-address change request is not issued (NO at Step S15), the digital-value output unit 133 performs the determining process of Step S14 again. When the output-address change request is issued (YES at Step S15), the digital-value output unit 133 updates the read address by an address specified by the output-address specifying data in the waveform-output-control-data storage area 144 (Step S16), reads a digital value stored at the read address in the waveform-data-string storage area 142, and outputs this digital value to the D/A conversion unit 120 (Step S17). The digital-value output unit 133 then deletes the output-address change request (Step S18) and performs the determining process of Step S14. Deleting the output-address change request means rewriting the output-address-change-request data value to a value that indicates the state where the output-address change request is not issued.

When the step-execution-mode stop request is made (YES at Step S8), when the output-address change mode is not specified (NO at Step S13), or when the output-address-change-mode stop request is made (YES at Step S14), the digital-value output unit 133 performs the process of Step S6.

As explained above, according to the embodiment of the present invention, the D/A conversion device 100 is configured to include the waveform-data-string storage area 142 that stores therein a waveform data string constituted by a plurality of digital values, the waveform-output-control-data storage area 144 in which operation-mode specifying data that specifies an operation mode and step-execution request data or output-address change-request data serving as update request data are written, the digital-value output unit 133 that, when operation-mode specifying data specifies an automatic control mode, while sequentially updating an address to be read in the waveform-data-string storage area 142 to an address where a subsequent digital value is stored for each output period set in advance, sequentially reads and outputs a digital value that constitutes a waveform data string from the address to be read for each output period, and that, when the operation-mode specifying data specifies a step execution mode or an output-address change mode, while updating the address to be read at a timing when the update request data is written, reads and outputs a digital value that constitutes the waveform data string from the address to be read, and the D/A conversion unit 120 that converts a digital value output by the digital-value output unit 133 into an analog value. Accordingly, when the automatic control mode is specified, the D/A conversion device 100 consecutively converts a digital value internally prepared in advance as the waveform data string into an analog value and therefore the analog value can be output at a rate up to a D/A conversion rate by the D/A conversion unit 120. When the step execution mode or the output-address change mode is specified, the D/A conversion device 100 updates an address at the timing when the update request data is written. Therefore, a user can confirm a waveform output at the automatic control mode. That is, the waveform can be output as quickly as possible and the output waveform can be debugged.

The D/A conversion device 100 is configured such that output-address specifying data that specifies an address in the waveform-data-string storage area 142 is further written in the waveform-output-control-data storage area 144 and when operation-mode specifying data specifies the output-address change mode, the digital-value output unit 133 updates the address to be read to an address specified by the output-address specifying data. Accordingly, a user can cause the D/A conversion device 100 to output a digital value constituting waveform data from an arbitrary address.

Furthermore, the D/A conversion device 100 is configured such that, when operation-mode specifying data specifies a step execution mode, the digital-value output unit 133 updates the address to be read to an address where a subsequent digital value constituting the waveform data string is stored. Accordingly, the timing of D/A converting and outputting the waveform data string can be controlled by a pulse input from outside.

The waveform data string stored in the waveform-data-string storage area 142 can be rewritten at an arbitrary timing. That is, a user can cause the D/A conversion device 100 to operate at the output-address change mode or the step execution mode, and when it is determined that an analog value of a desired waveform is not obtained, it is possible to modify the waveform data string stored in the waveform-data-string storage area 142 by using the D/A conversion device 100, the CPU device 200, and the waveform-data-string support tool 500. Alternatively, it is also possible to configure such that when a digital value corresponding to the currently outputting analog value is rewritten, the digital-value output unit 133 immediately updates the outputting analog value based on the rewritten digital value.

Industrial Applicability

As described above, the conversion device, the peripheral device, and the programmable logic controller according to the present invention are preferable to be applied to a conversion device that performs D/A conversion, a peripheral device that performs setting of the conversion device, and a programmable logic controller.

REFERENCE SIGNS LIST

10 PLC system
100 D/A conversion device
110 analog output interface
120 D/A conversion unit
130 computation unit
131 waveform-data-string writing unit
132 waveform-data-string generation unit
133 digital-value output unit
140 shared memory
142 waveform-data-string storage area
143 waveform-output-format-data storage area
144 waveform-output-control-data storage area
150 trigger-signal input interface
160 bus interface
170 internal bus
180 counter
190 built-in memory
200 CPU device
210 external memory interface
220 computation unit
230 built-in memory
240 peripheral device interface
250 bus interface
260 internal bus
300 inter-device bus
500 waveform-data-string support tool
1000 PLC
2000 peripheral device
3000 connection cable

The invention claimed is:

1. A conversion device comprising:
a waveform-data-string storage unit that stores therein a waveform data string including a plurality of digital values;
a control-data storage unit in which operation-mode specifying data that specifies an operation mode and update request data are written;
a digital-value output unit that, when the operation-mode specifying data specifies a first operation mode, while sequentially updating an address to be read in the waveform-data-string storage unit to an address where a subsequent digital value is stored for each output period set in advance, sequentially reads and outputs the digital value that constitutes the waveform data string from the address to be read for the each output period and that, when the operation-mode specifying data specifies a second operation mode, while updating the address to be read at a timing when the update request data is written, reads and outputs the digital value that constitutes the waveform data string from the address to be read; and
a D/A conversion unit that converts the digital value output by the digital-value output unit into an analog value.

2. The conversion device according to claim 1, wherein address specifying data that specifies an address in the waveform-data-string storage unit is further written in the control-data storage unit, and
when the operation-mode specifying data specifies the second operation mode, the digital-value output unit updates the address to be read to an address specified by the address specifying data.

3. The conversion device according to claim 1, wherein when the operation-mode specifying data specifies the second operation mode, the digital-value output unit updates the address to be read to an address where a subsequent digital value that constitutes the waveform data string is stored.

4. A peripheral device that is connected to a D/A conversion device, which includes a waveform-data-string storage unit that stores therein a waveform data string including a plurality of digital values, a control-data storage unit in which operation-mode specifying data that specifies an operation mode and update request data are written, a digital-value output unit that, when the operation-mode specifying data specifies a first operation mode, while sequentially updating an address to be read in the waveform-data-string storage unit to an address where a subsequent digital value is stored for each output period set in advance, sequentially reads and outputs the digital value that constitutes the waveform data string from the address to be read for the each output period and that, when the operation-mode specifying data specifies a second operation mode, while updating the address to be read at a timing when the update request data is written, reads and outputs the digital value that constitutes the waveform data string from the address to be read, and a D/A conversion unit that converts the digital value output by the digital-value output unit into an analog value, the peripheral device comprising:
an input unit that receives an input from a user; and
a waveform-data-string support unit that writes the operation-mode specifying data or the update request data into the control-data storage unit based on an input received by the input unit.

5. The peripheral device according to claim 4, wherein the waveform-data-string support unit writes address specifying data that specifies an address in the waveform-data-string storage unit into a control-data storage unit included by the conversion device based on an input received by the input unit, and
when the operation-mode specifying data specifies a second operation mode, a digital-value output unit included by the conversion device updates the address to be read to an address specified by address specifying data written in the control-data storage unit.

6. The peripheral device according to claim 4, wherein the waveform-data-string support unit writes a waveform data string into the waveform-data-string storage unit based on an input received by the input unit.

7. A programmable logic controller comprising:
a waveform-data-string storage unit that stores therein a waveform data string including a plurality of digital values;
a control-data storage unit in which operation-mode specifying data that specifies an operation mode and update request data are written;
a digital-value output unit that, when the operation-mode specifying data specifies a first operation mode, while sequentially updating an address to be read in the waveform-data-string storage unit to an address where a subsequent digital value is stored for each output period set in advance, sequentially reads and outputs the digital value that constitutes the waveform data string from the address to be read for the each output period and that, when the operation-mode specifying data specifies a second operation mode, while updating the address to be read at a timing when the update request data is written, reads and outputs the digital value that constitutes the waveform data string from the address to be read; and
a D/A conversion unit that converts the digital value output by the digital-value output unit into an analog value.

8. The programmable logic controller according to claim 7, wherein
address specifying data that specifies an address in the waveform-data-string storage unit is further written in the control-data storage unit, and
when the operation-mode specifying data specifies the second operation mode, the digital-value output unit updates the address to be read to an address specified by the address specifying data.

9. The programmable logic controller according to claim 7, wherein when the operation-mode specifying data specifies the second operation mode, the digital-value output unit updates the address to be read to an address where a subsequent digital value that constitutes the waveform data string is stored.

* * * * *